United States Patent
Chung et al.

(10) Patent No.: US 8,928,629 B2
(45) Date of Patent: Jan. 6, 2015

(54) SELF-ADJUSTING PHOTOSENSITIVE TOUCH CIRCUIT AND DISPLAY DEVICE THEREOF

(75) Inventors: Yueh-Hung Chung, Hsin-Chu (TW); Ya-Ling Hsu, Hsin-Chu (TW)

(73) Assignee: Au Optronics Corp., Hsin-Chu (TW)

( * ) Notice: Subject to any disclaimer, the term of this patent is extended or adjusted under 35 U.S.C. 154(b) by 333 days.

(21) Appl. No.: 13/425,507

(22) Filed: Mar. 21, 2012

(65) Prior Publication Data

US 2013/0100077 A1    Apr. 25, 2013

(30) Foreign Application Priority Data

Oct. 20, 2011   (TW) .............................. 100138161 A

(51) Int. Cl.
*G06F 3/042* (2006.01)
*G06F 3/041* (2006.01)

(52) U.S. Cl.
CPC .............. *G06F 3/042* (2013.01); *G06F 3/0416* (2013.01)
USPC ......................................................... 345/175

(58) Field of Classification Search
None
See application file for complete search history.

(56) References Cited

U.S. PATENT DOCUMENTS

| | | | |
|---|---|---|---|
| 7,742,041 B2 | 6/2010 | Lee et al. | |
| 7,999,796 B2 | 8/2011 | Lee et al. | |
| 2006/0017710 A1* | 1/2006 | Lee et al. | 345/173 |
| 2007/0109239 A1 | 5/2007 | den Boer et al. | |
| 2009/0020686 A1 | 1/2009 | Sano et al. | |
| 2010/0214203 A1* | 8/2010 | Lee et al. | 345/92 |
| 2011/0115733 A1 | 5/2011 | Shih | |
| 2011/0134078 A1 | 6/2011 | Hsu et al. | |

FOREIGN PATENT DOCUMENTS

| | | |
|---|---|---|
| CN | 101101525 | 1/2008 |
| CN | 101349821 | 1/2009 |
| TW | 201118485 | 6/2011 |
| TW | 201120418 | 6/2011 |

OTHER PUBLICATIONS

Taiwan Patent Office, "Office Action", Mar. 12, 2014.
China Patent Office, "Office Action", Nov. 21, 2013.

* cited by examiner

*Primary Examiner* — David D Davis
(74) *Attorney, Agent, or Firm* — WPAT, PC; Justin King

(57) ABSTRACT

The present invention relates to a self-adjusting photosensitive touch circuit, which includes a light-sensing component, a variable capacitor and a switch component. The light-sensing component is for sensing a touch status and receives a first control signal. The light-sensing component is enabled by a level of the first control signal. The variable capacitor is electrically coupled to the light-sensing component. A capacitance of the variable capacitor is altered along with a voltage difference between two terminals of the variable capacitor. The switch component is electrically coupled to the variable capacitor, and receives a second control signal. The switch component is enabled by a level of the second control signal. Therefore, a range of the gate voltage difference of the light-sensing component can be increased, so as to improve the sensitivity and accuracy of the light-sensing component. Moreover, the present invention also relates to a display device thereof.

16 Claims, 9 Drawing Sheets

SELF-ADJUSTING PHOTOSENSITIVE TOUCH CIRCUIT AND DISPLAY DEVICE THEREOF

TECHNICAL FIELD

The disclosure generally relates to a touch circuit and a display device, and more particularly to a self-adjusting photosensitive touch circuit and a display device thereof.

BACKGROUND

At present, touch panel technology generally includes following several types: resistive type, capacitive type, optical type, electromagnetic type, ultrasonic type, and in-cell type liquid crystal panel (which includes resistive type, capacitive type, and optical type). In a display device with an in-cell type photosensitive touch panel, it uses leakage current differences caused by different light irradiation intensity as a condition whether turning on a light-sensing component in the in-cell type photosensitive touch panel, so as to judge whether the in-cell type photosensitive touch panel has been touched.

For example, the light-sensing component includes a thin film transistor, and so on. When the light-sensing component is touched by a finger, irradiated by ambient light, and touched by a light pen, leakage currents of the thin film transistor are corresponding to a first current value, a second current value, and a third current value, respectively. Therefore, when the light irradiation intensity received by the light-sensing component is higher, the leakage current Ids of the thin film transistor is greater, that is to say, the first current value is less than the second current value, and the second current value is less than the third current value. Then, a charge difference generated by the different leakage currents of the thin film transistor is converted into an output voltage by an integrator, so as to judge whether is touched according to the value of the output voltage.

The above-mentioned judging process only employs one thin film transistor as an example. However, a touch panel can includes ten thousand light-sensing components, and current-voltage curves of each thin film transistor in the touch panel may be different. As shown in FIG. 1, a current-voltage curve of a first thin film transistor TFTA is different from that of a second thin film transistor TFTB. For example, in the conditions with light irradiation and no light irradiation, a same gate voltage Vgs (e.g., −3 volts), for the first film transistor TFTA, it can effectively judge whether the first film transistor TFTA is touched. However, for the second film transistor TFTB, a misjudgment result may be generated. Therefore, based on difference characteristics of the different thin film transistors, the light-sensing component may generate misjudgment results.

SUMMARY OF EMBODIMENTS

Accordingly, the present disclosure relates to a self-adjusting photosensitive touch circuit and a display device thereof, which can use a variable capacitor which can adjust a capacitance thereof, to increase a range of a gate voltage difference of the light-sensing component and reduce the misjudgment probability of the light-sensing component.

The present disclosure relates to a self-adjusting photosensitive touch circuit, which includes a light-sensing component, a variable capacitor, and a switch component. The light-sensing component is for sensing a touch status, and receives a first control signal. The light-sensing component is enabled by a level of the first control signal. The variable capacitor is electrically coupled to the light-sensing component. Capacitance of the variable capacitor is altered along with a voltage difference between two terminals of the variable capacitor. The switch component is electrically coupled to the variable capacitor, and receives a second control signal. The switch component is enabled by a level of the second control signal.

The present disclosure also relates to a self-adjusting photosensitive touch display device, which includes at least one scanning line, at least one data line, a plurality of display pixel units, and at least one self-adjusting photosensitive touch circuit. The display pixel units are electrically coupled to the scanning line and each of the data line, respectively. The self-adjusting photosensitive touch circuit includes a light-sensing component, a variable capacitor, and a switch component. The light-sensing component is for sensing a touch status, and receives a first control signal. The light-sensing component is enabled by a level of the first control signal. The variable capacitor is electrically coupled to the light-sensing component. A capacitance of the variable capacitor is altered along with a voltage difference between two terminals of the variable capacitor. The switch component is electrically coupled to the variable capacitor, and receives a second control signal. The switch component is enabled by a level of the second control signal.

In summary, the self-adjusting photosensitive touch circuit and the display device of the present disclosure uses the characteristics of the variable capacitor which can automatically adjust the capacitance thereof. When there is no light irradiation on the touch circuit, the variable capacitor automatically changes to have a small capacitance, so that the stored charge is small. When there is light irradiation on the touch circuit, the variable capacitor changes to a large capacitance, so that the stored charge is great, thereby making a charge difference between the light irradiation condition and no light irradiation condition be greater. In other words, the range of the gate voltage difference of the light-sensing component can be increased, so as to improve sensitivity and accuracy of the light-sensing component and the touch display device thereof.

Other embodiments of the disclosure will be further understood from the further technological features disclosed by the embodiments of the present disclosure wherein there are shown and described preferred embodiments, simply by way of illustration of modes best suited to carry out the disclosure.

BRIEF DESCRIPTION OF THE DRAWINGS

The various embodiments disclosed herein will be better understood with respect to the following description and drawings, in which like numbers refer to like parts throughout, and in which.

DETAILED DESCRIPTION

Figure 1:
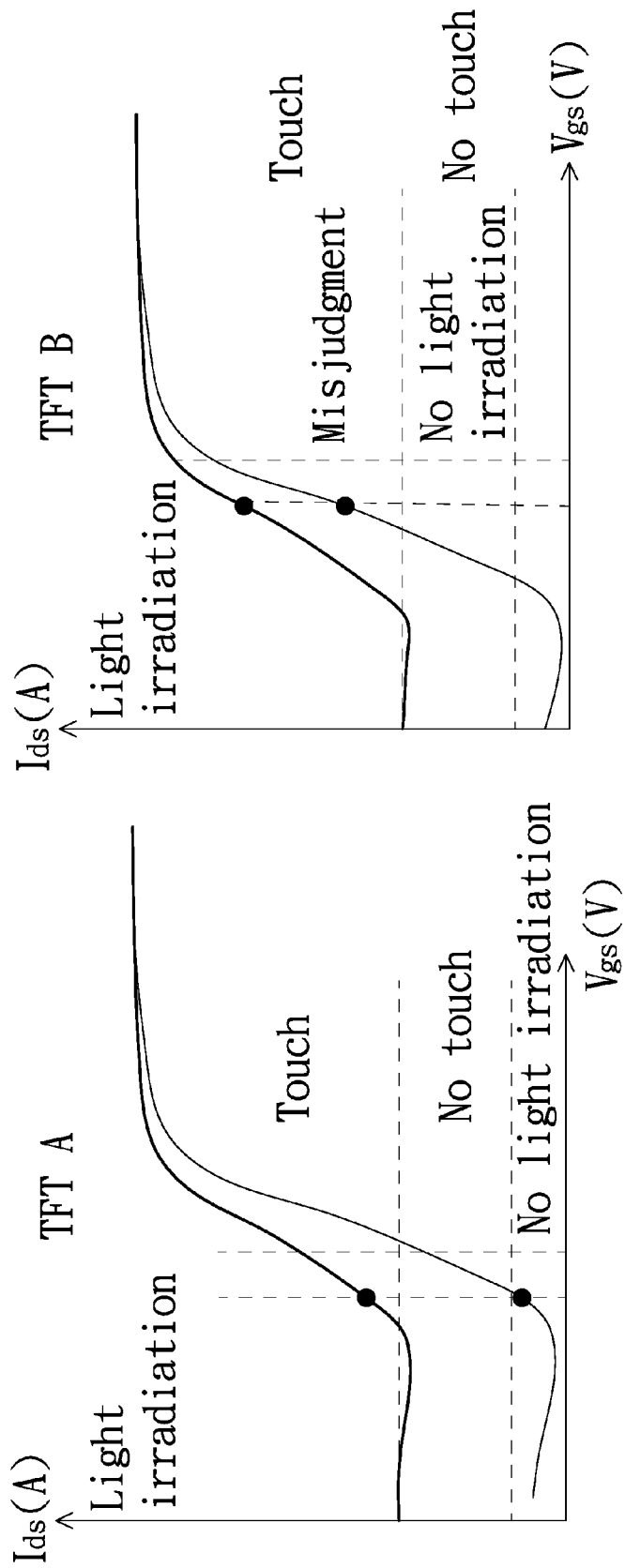
FIG. 1 is a current-voltage curve diagram of a thin film transistor of a conventional technology.
Figure 2:
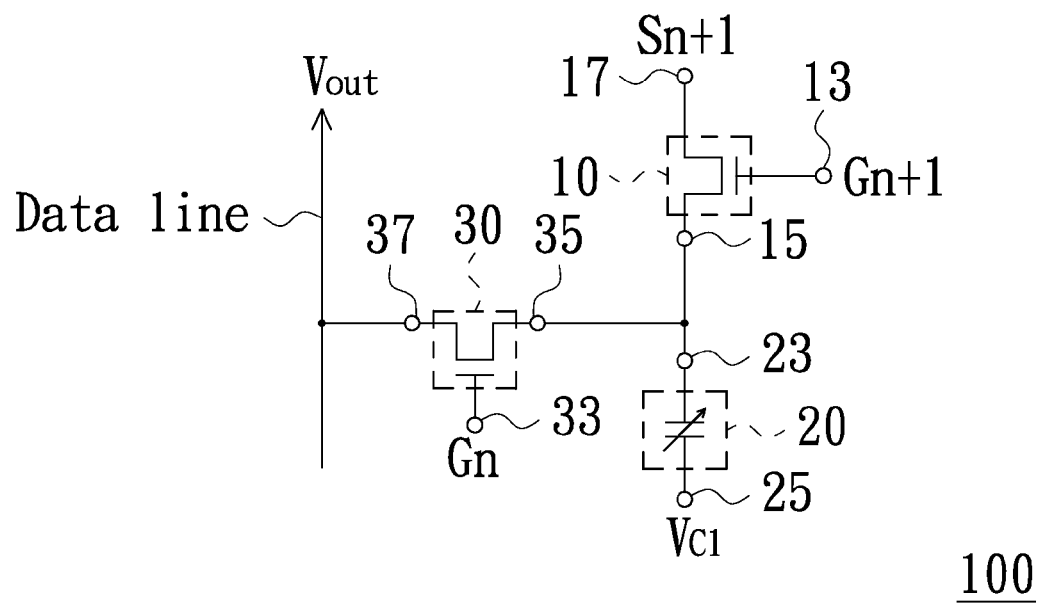
FIG. 2 is a schematic view of a circuit in accordance with a first exemplary embodiment of the present disclosure.

FIG. 2 is a schematic view of a circuit in accordance with a first exemplary embodiment of the present disclosure. Referring to FIG. 2, a self-adjusting photosensitive touch circuit 100 in accordance with the first exemplary embodiment of the present disclosure includes a light-sensing component 10, a variable capacitor 20, and a switch component 30.

The light-sensing component 10 is configured for sensing a touch status corresponding to a user's operation. The light-sensing component 10 may be a photoelectric thin film transistor. The light-sensing component 10 can receive a first control signal Gn+1, and the light-sensing component 10 is enabled by a level of the first control signal Gn+1. For example, the high level of the first control signal Gn+1 can make the light-sensing component 10 be turned on. The light-sensing component 10 includes a first terminal (e.g., a gate) 13, a second terminal (e.g., a drain) 15, and a third terminal (e.g., a source) 17. The first terminal 13 receives the first control signal Gn+1. The third terminal 17 receives a third control signal Sn+1.

The variable capacitor 20 is electrically coupled to the light-sensing component 10. In detail, the variable capacitor 20 includes a first terminal 23 and a second terminal 25. The first terminal 23 is electrically coupled to the second terminal 15 of the light-sensing component 10. The second terminal 25 receives a reference voltage Vc1. The variable capacitor 20 can change its capacitance along with a voltage difference between the first terminal 23 and the second terminal 25. For example, when the voltage difference between the first terminal 23 and the second terminal 25 of the variable capacitor 20 is greater, the capacitance of the variable capacitor 20 is less. In other words, the voltage difference is inversely proportional to the capacitance of the variable capacitor 20. The variable capacitor 20 may be a metal insulator semiconductor (MIS) capacitor.

The switch component 30 is electrically coupled to the variable capacitor 20. The switch component 30 receives a second control signal Gn, and the switch component 30 is enabled by level of the second control signal Gn. For example, the high level of the second control signal Gn can make the switch component 30 be turned on. The switch component 30 may be a MIS field effect transistor switch, or a thin film transistor switch. The switch component 30 includes a first terminal (e.g., a gate) 33, second terminal (e.g., a drain) 35, and a third terminal (e.g., a source) 37. The first terminal 33 receives the second control signal Gn. The second terminal 37 is electrically coupled to the first terminal 23 of the variable capacitor 20. The third terminal 37 is electrically coupled to a data line (or is called a readout line). Therefore, output voltage Vout can be provided to a next-stage circuit (not shown).

Figure 3:
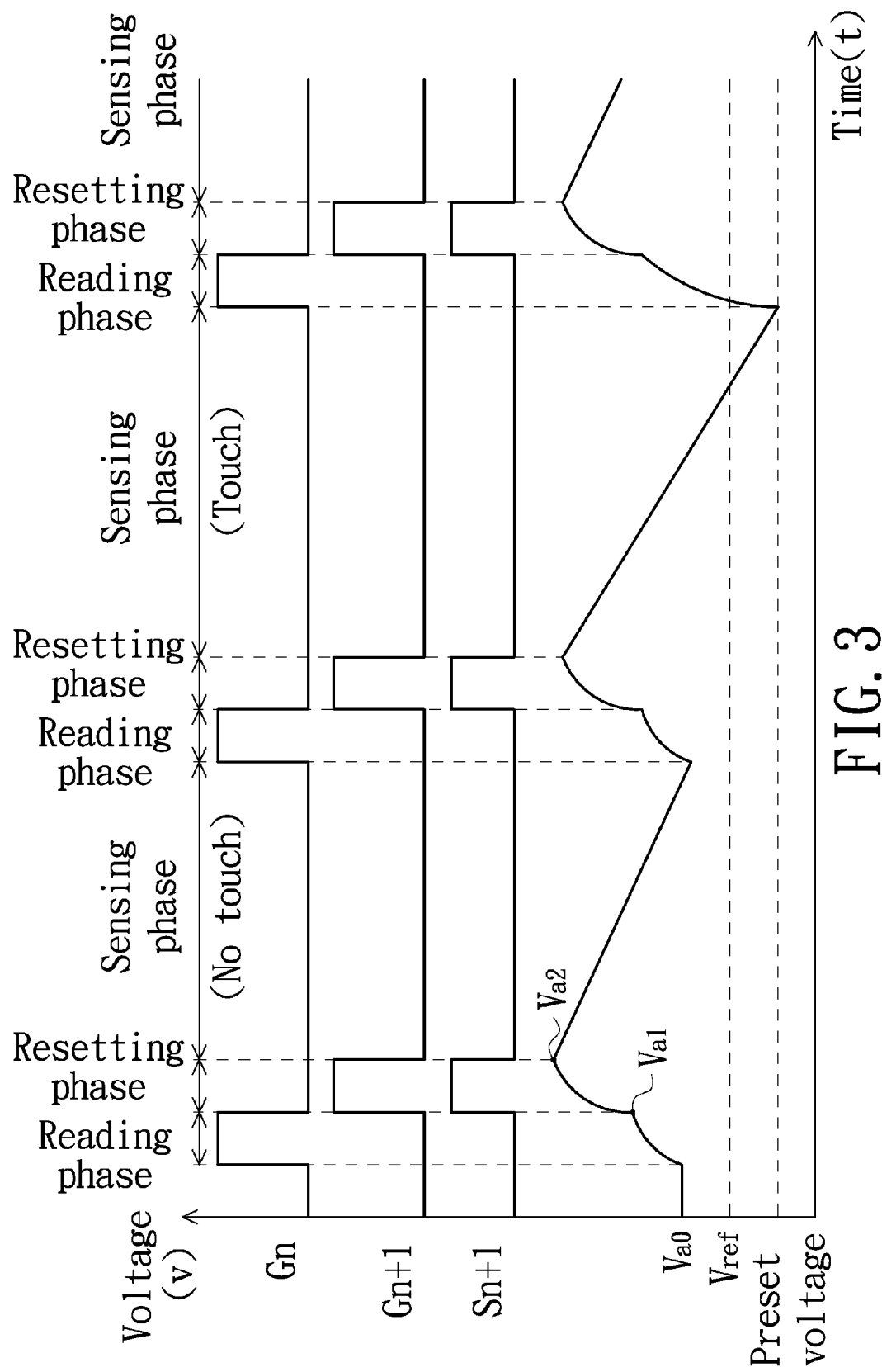
FIG. 3 is a timing-sequence view of signals of the first exemplary embodiment of the present disclosure.

FIG. 3 is a time-sequence view of signals of the first exemplary embodiment of the present disclosure. Please referring to FIG. 2 and FIG. 3 together, the following will describe the operation principle of the self-adjusting photosensitive touch circuit 100, and the operation process of the self-adjusting photosensitive touch circuit 100 can be divided into a reading-out stage, a resetting stage, and a sensing stage.

Figure 9:
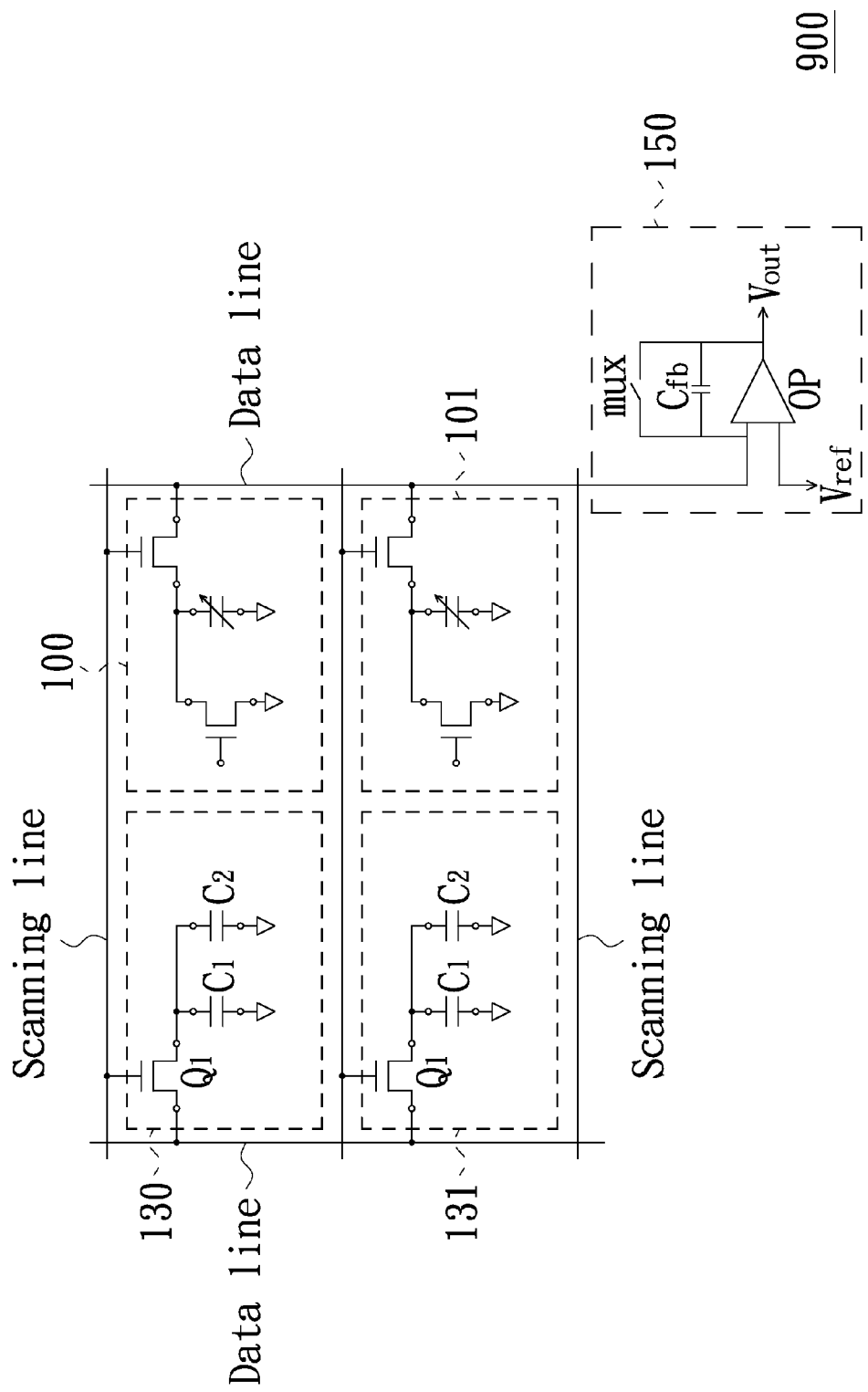
FIG. 9 is a partial circuit block diagram of a display device in accordance with an exemplary embodiment of the present disclosure.

Firstly, in the reading-out stage, when the second control signal Gn is in the high level, the switch component 30 is turned on, the voltage Va0 of the first terminal 23 of the variable capacitor 20 is increased to a first voltage value Va1 (or a reference voltage Vref as shown in FIG. 9) with time.

In the resetting stage, when the first control signal Gn+1 and the third control signal Sn+1 are in the high level, and the second control signal Gn is in the low level, the switch component 30 is turned off, the light-sensing component 10 is turned on, and voltage Va0 is increased from the first voltage value Va1 to a second voltage value Va2 with time. The second voltage value Va2 is close to the voltage value of the third control signal Sn+1. In addition, when the first control signal Gn+1 and the third control signal Sn+1 are in the high level, rising edges of the first control signal Gn+1 and the third control signal Sn+1 are behind a rising edge of the second control signal Gn.

In the sensing stage, when the first control signal Gn+1 and the third control signal Sn+1 is in the low level, and the second control signal Gn is in the low level, the switch component 30 is turned off and the light-sensing component 10 is turned off, the gate voltage Vgs of the light-sensing component 10 is equal to a value that the low level of the first control signal Gn+1 subtracts the low level of the third control signal Sn+1. Thus, the voltage Va0 decreases from the second voltage value Va2 with time.

Then, return back to the reading stage, when the second control signal Gn is in the high level again, the switch component 30 is turned on, and the voltage Va0 of the first terminal 23 of the variable capacitor 20 is increased again to the first voltage value Va1 (or the reference voltage Vref) with time.

Therefore, when there is no light irradiation, the voltage Va0 is increased to cause the voltage difference ΔV to be decreased, the capacitance of the variable capacitor 20 is automatically decreased, so that the charge stored in the variable capacitor 20 becomes less. The voltage difference ΔV is equal to a value that the reference voltage Vc1 subtracts the voltage Va0. Then, when the second control signal Gn is in the high level again, the integrator 150 (as shown in FIG. 9) judges the touch state according to a relationship between the current voltage Va0 and the reference voltage Vref. In detail, in the reading-out stage, when the voltage Va0 is not less than the reference voltage Vref, it determines the touch status is no touch.

When the light irradiates with the high intensity, the voltage Va0 is decreased to cause the voltage difference ΔV is increased, the capacitance of the variable capacitor 20 is automatically increased, so that the charge stored in the variable capacitor 20 becomes greater. Similarly, when the second control signal Gn is in the high level again, the integrator 150 judges the touch status according to a relationship between the current voltage Va0 and the reference voltage Vref. In detail, in the reading-out stage, when the voltage Va0 is less than the reference voltage Vref and is equal to a preset voltage value, it determines the touch status is having the touch. The reference voltage Vref is greater than the preset voltage value. It should be noted that, the judgment of the touch status in the embodiments of the preset disclosure are only for examples, it is not used as constraint conditions, and the judgment of the touch status mainly depends on the structure or the setting value of a back-end detection circuit (e.g., the integrator 150).

Figure 4A:
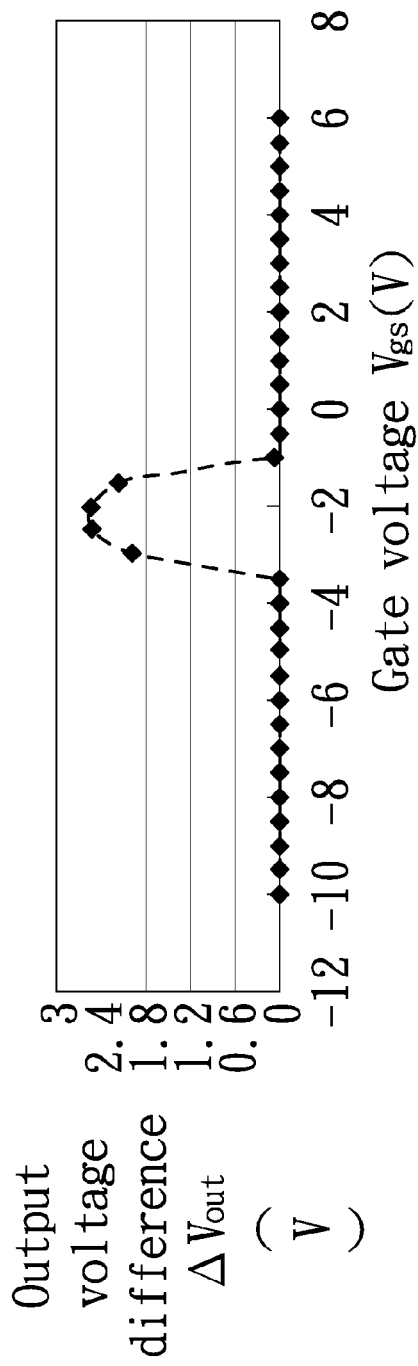
FIG. 4A is a curve diagram of an output voltage difference and a gate voltage of a conventional technology.
Figure 4B:
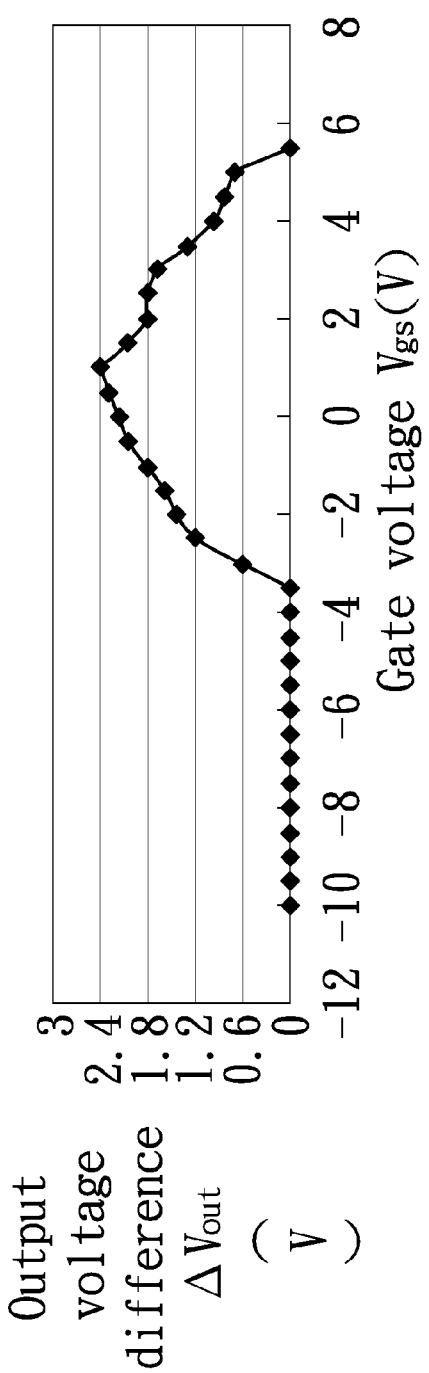
FIG. 4B is a curve diagram of an output voltage difference and a gate voltage of the first exemplary embodiment of the present disclosure.

FIG. 4A is a curve diagram of the output voltage difference and the gate voltage of a conventional technology. FIG. 4B is a curve diagram of the output voltage difference and the gate voltage of the first exemplary embodiment of the present disclosure. Referring to FIG. 4A, the conventional technology uses a capacitor with a fixed capacitance, the gate voltage Vgs of the light-sensing component 10 is in a range from about −3.8 volts to 1.2 volts. Referring to FIG. 4B, after using the variable capacitor 20 of the first embodiment of the present disclosure, the gate voltage Vgs of the light-sensing component 10 is in a range from about −3.5 volts to 5.2 volts. Therefore, an operational range of the light-sensing component 10 is approximately 3 times that of the light-sensing component of the conventional technology. It should be noted that, due to the operational range of the light-sensing component 10 of the present disclosure being increased, it will increase the misjudgment probability of the light-sensing component 10, and improve relatively the sensitivity and accuracy of the light-sensing component 10.

Figure 5:
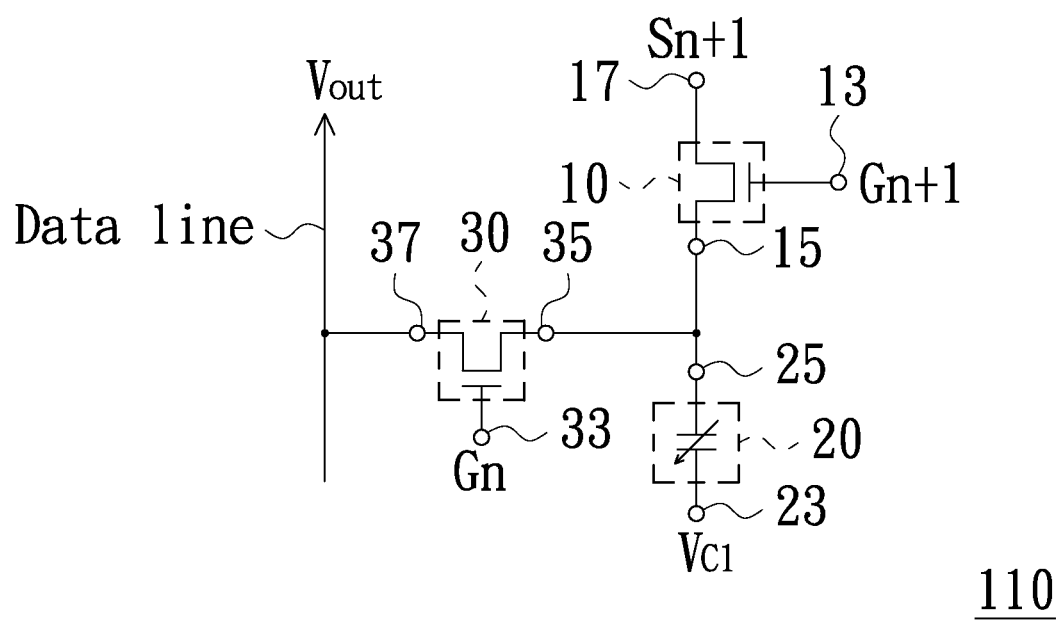
FIG. 5 is a schematic view of a circuit in accordance with a second exemplary embodiment of the present disclosure.

FIG. 5 is a schematic view of a circuit in accordance with a second exemplary embodiment of the present disclosure. Referring to FIG. 5, that the second embodiment is similar with the first embodiment, except that the connection relationship of the variable capacitor 20 in the second embodiment is opposite to the connection relationship of the variable capacitor 20 in the first embodiment. In detail, the first terminal 23 of the variable capacitor 20 in the second embodiment receives the reference voltage Vc1, and the second terminal 25 is electrically coupled to the second terminal 15 of the light-sensing component 10.

It should be noted that, in the second embodiment, the third control signal Sn+1 received by the third terminal of the light-sensing component 10 is in the low level (e.g., from −6 volts to −16 volts), which is opposite to that of the first embodiment. When the voltage difference ΔV of the variable capacitor 20 is increased, the capacitance of the variable capacitor 20 is decreased. When the voltage difference ΔV of the variable capacitor 20 is decreased, the capacitance of the variable capacitor 20 is increased. Connection relationships of other components in the second embodiment are same to those of the first embodiment, which will not be repeated herein.

Figure 6:
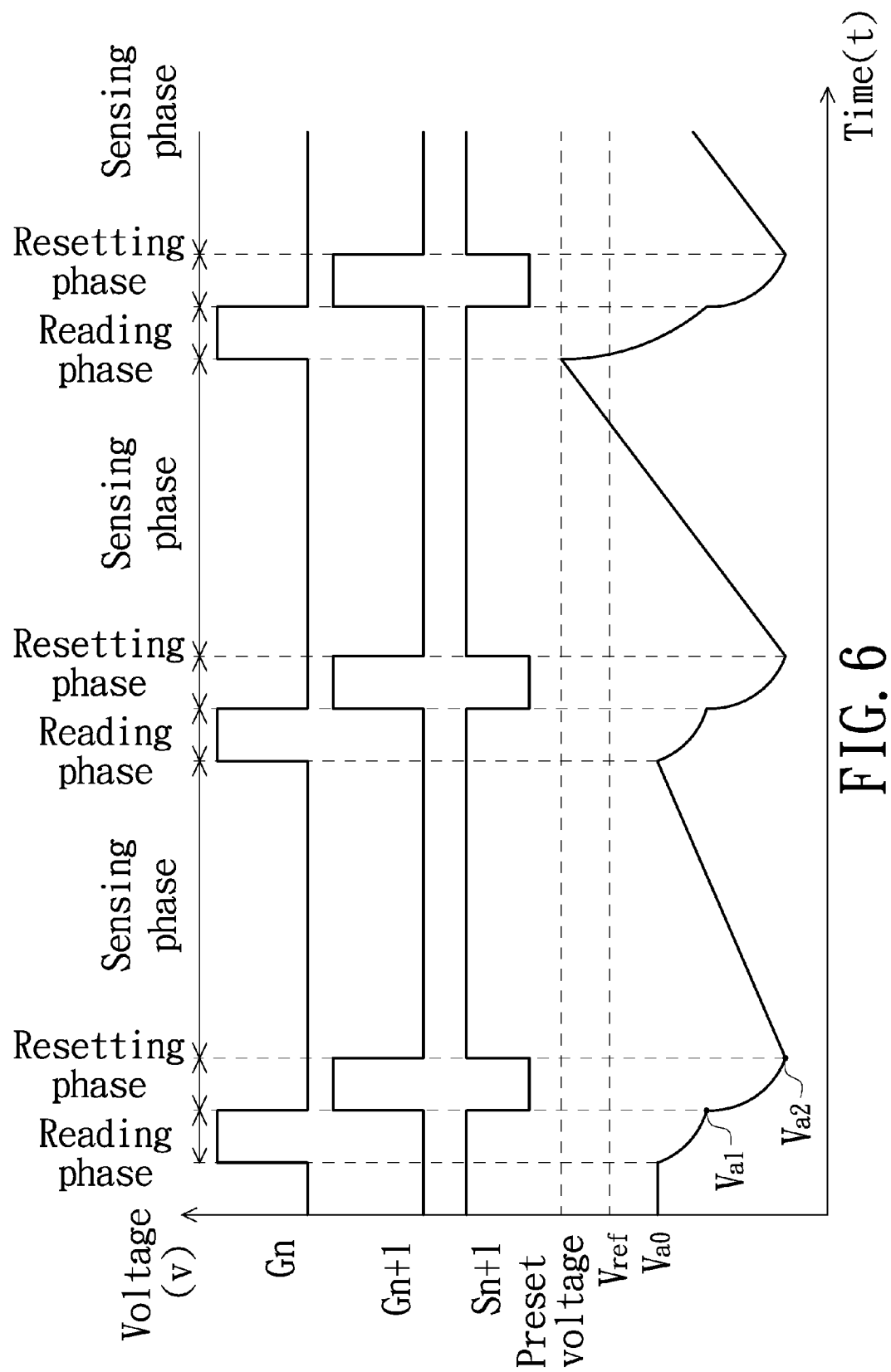
FIG. 6 is a timing-sequence view of signals of the second exemplary embodiment of the present disclosure.

FIG. 6 is a timing-sequence view of the second exemplary embodiment of the present disclosure. Referring to FIG. 5 and FIG. 6 together, the following will describe an operation principle of the self-adjusting photosensitive touch circuit 110, and an operation process of the self-adjusting photosensitive touch circuit 110 can be divided into a reading-out stage, a resetting stage, and a sensing stage.

Firstly, in the reading-out stage, when the second control signal Gn is in the high level, the switch component 30 is turned on, the voltage Va0 of the first terminal 23 of the variable capacitor 20 is decreased to the first voltage value Va1 with time.

In the resetting stage, when the first control signal Gn+1 is in the high level, the third control signal Sn+1 are in the low stage and the second control signal Gn is in the low level, the switch component 30 is turned off, the light-sensing component 10 is turned on, and the voltage Va0 is decreased from the first voltage value Va1 to the second voltage value Va2 with time. In addition, when the first control signal Gn+1 is in the high level and the third control signal Sn+1 is in the low level, a rising edge of the first control signal Gn+1 and a falling edge of the third control signal Sn+1 are behind a rising edge of the second control signal Gn.

In the sensing stage, when the first control signal Gn+1 and the third control signal Sn+1 are in the low level, and the second control signal Gn is in the low level, the switch component 30 is turned off and the light-sensing component 10 is turned off, the gate voltage Vgs of the light-sensing component 10 is equal to a value that the low level of the first control signal Gn+1 subtracts the voltage Va0. Thus, the voltage Va0 increases from the second voltage value Va2 with time.

Then, return back to the reading-out stage, when the second control signal Gn is in the high level again, the switch component 30 is turned on, and the voltage Va0 of the first terminal 23 of the variable capacitor 20 is increased to the first voltage value Va1 with time.

Therefore, when there is no light irradiation, the voltage Va0 is decreased to cause the voltage difference ΔV is increased, the capacitance of the variable capacitor 20 is automatically decreased, so that the charge stored in the variable capacitor 20 becomes less. The voltage difference ΔV is equal to a value that the reference voltage Vc1 subtracts the voltage Va0. Then, when the second control signal Gn is in the high level again, the integrator 150 (as shown in FIG. 9) judges the touch status according to a relationship between the voltage Va0 and the reference voltage Vref. In detail, when the voltage Va0 is not greater than the reference voltage Vref, the touch status is no touch.

When the light irradiates with the high intensity, the voltage Va0 is increased to cause the voltage difference ΔV is decreased, the capacitance of the variable capacitor 20 is automatically increased, so that the charge stored in the variable capacitor 20 becomes greater. Finally, when the second control signal Gn is in the high level again, the integrator 150 (as shown in FIG. 9) judges the touch status according to a relationship between the current voltage Va0 and the reference voltage Vref. In detail, when the voltage Va0 is greater than the reference voltage Vref and is equal to a preset voltage value, it judges the touch status is having touch. The reference voltage Vref is less than the preset voltage value.

Figure 7A:
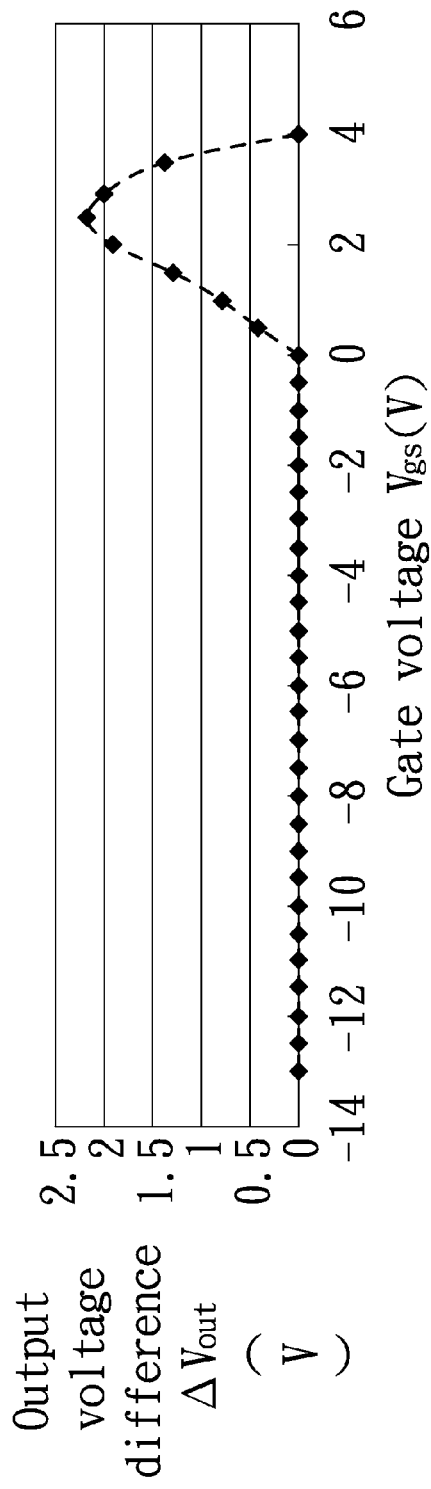
FIG. 7A is another curve diagram of another output voltage difference and a gate voltage of a conventional technology.
Figure 7B:
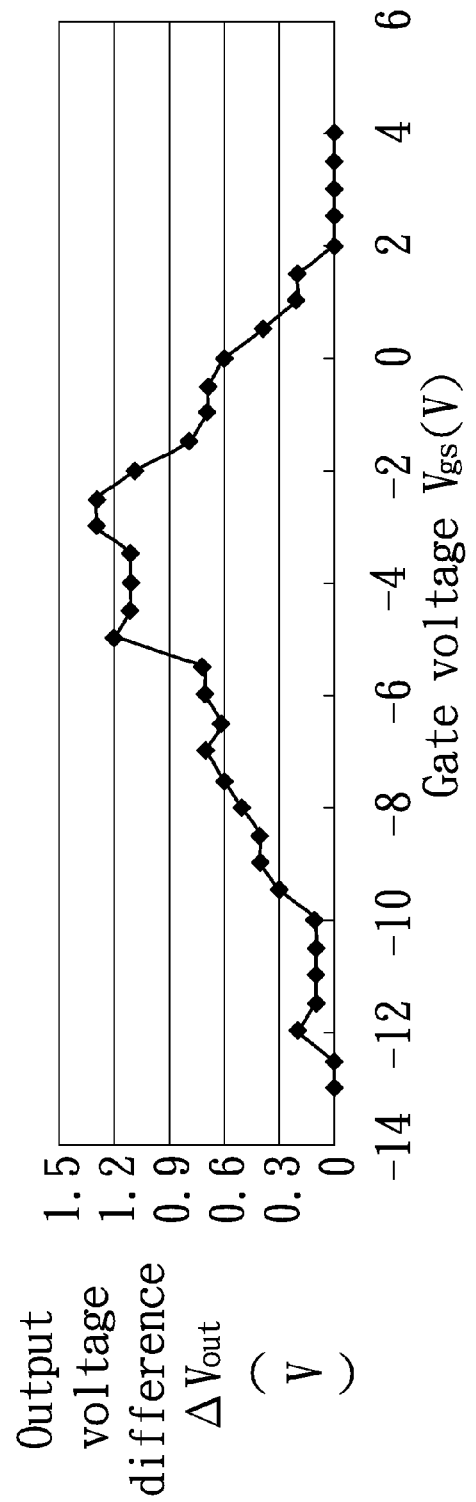
FIG. 7B is a curve diagram of an output voltage difference and a gate voltage of the second exemplary embodiment of the present disclosure.

FIG. 7A is another curve diagram of the output voltage difference and the gate voltage of a conventional technology. FIG. 7B is a curve diagram of the output voltage difference and the gate voltages of the second exemplary embodiment of the present disclosure. Referring to FIG. 7A, the conventional technology uses a capacitor with a fixed capacitance, the gate voltage Vgs of the light-sensing component 10 is in a range from about 0 volt to 4 volts. Referring to FIG. 7B, after using the variable capacitor 20 of the second embodiment of the present disclosure, the third terminal 17 of the light-sensing component 10 receives a low level (e.g., from −6 volts to −16 volts) of the third control signal Sn+1. The gate voltage Vgs of the light-sensing component 10 is in a range from about 2 volts to −10 volts. Therefore, an operational range of the light-sensing component 10 is approximately 3 times that of the light-sensing component of the conventional technology. It should be noted that, due to the operational range of the light-sensing component 10 being increased, the present disclosure will decrease the misjudgment probability of the light-sensing component 10, and improve the sensitivity and accuracy of the light-sensing component 10.

Figure 8:
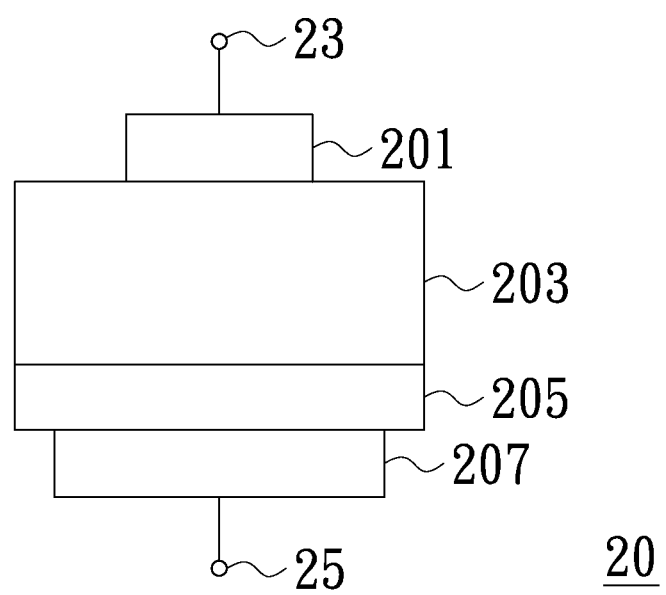
FIG. 8 is a structure schematic view of a variable capacitor in accordance with an exemplary embodiment of the present disclosure.

FIG. 8 is a structure schematic view of a variable capacitor in accordance with an exemplary embodiment of the present disclosure. Referring to FIG. 8, the variable capacitor 20 has a vertical stack structure. The variable capacitor 20 can be made by a physical vapor deposition (PVD) process or a chemical vapor deposition (CVD) process. The variable capacitor 20 includes a metal layer 201, a semiconductor layer 203, an insulating layer 205 (or is called as an oxide layer), and a metal layer 207.

In general, carriers in the semiconductor layer 203 can migrate with the applied voltage, which causes interface between the insulating layer 205 and the semiconductor layer 203 to occur carrier accumulation, depletion, or reversal phenomenon, thereby affecting the capacitance of the variable capacitor 20. In addition, in another embodiment of the present disclosure, the metal layer 201 can be omitted.

It should be noted that, because the variable capacitor 20 has a simple structure, and is easy to be produced, so that the process of the original touch display device will not be affected. In other words, the self-adjusting photosensitive touch circuit in accordance with the embodiments of the present disclosure does not affect the yield and productivity of the original touch display device, but it can improve the sensitivity and accuracy of the touch display device.

FIG. 9 is a partial circuit block diagram of a display device in accordance with an exemplary embodiment of the present disclosure. Referring to FIG. 9, the display device 900 includes at least one scanning line, at least one data line, a display pixel unit 130, a display pixel unit 131, a self-adjusting photosensitive touch circuit 100, a self-adjusting photosensitive touch circuit 101, and an integrator 150.

The display pixel unit 130 is electrically coupled to the scanning line and the data line, respectively. The display pixel unit 130 includes a thin film transistor Q1, a liquid crystal capacitor C1, and a storage capacitor C2. A gate of the thin film transistor Q1 is electrically coupled to the scanning line which is in the horizontal direction, a source of the thin film transistor Q1 is electrically coupled to the data line which is in the vertical direction, and a drain of the thin film transistor Q1 is electrically coupled to one terminal of the liquid crystal capacitor C1 and one terminal of the storage capacitor C2.

When a sufficient voltage is applied on the scanning line in the horizontal direction, the thin film transistor Q1 which is electrically coupled to the scanning line can be turned on. At the moment, the drain of the thin film transistor Q1 can be electrically coupled to the data line in the vertical direction. So that, a video-signal voltage of the data line can be written into the liquid crystal capacitor C1 and the storage capacitor C2 of the display pixel unit 130, thereby, thereby, it can control light transmittance of different liquid crystal (not shown) to achieve a control color effect.

The self-adjusting photosensitive touch circuit 100 includes a light-sensing component 10, a variable capacitor 20 and a switch component 30. A source of the switch component 30 is electrically coupled to the data line (or is called as a readout line). One terminal of the data line is coupled to a first terminal of an operational amplifier OP in the integrator 150. A capacitor Cfb and a multiplexer Mux are electrically coupled in parallel between the first terminal of the operational amplifier OP and an output terminal of the operational amplifier OP. A second terminal of the operational amplifier OP receives the reference voltage Vref.

When there is no light irradiation, and a sufficient voltage is applied on the scanning line, the switch component 30 is turned on, the voltage Va0 of one terminal of the variable capacitor 20 can be set to be equal to the reference voltage Vref. Then, when the first control signal Gn+1 and the third control signal Sn+1 are in the high level, and the scanning line (or the second control signal Gn) is in the low level, the switch component 30 is turned off, the light-sensing component 10 is turned on. When the first control signal Gn+1 and the third control signal Sn+1 are in the low level, and the scanning line (or the second control signal Gn) is in the low level, the switch component 30 and the light-sensing component 10 are turned off.

Due to no light irradiation, the voltage Va0 is great to cause the voltage difference ΔV small, the capacitance of the variable capacitor 20 is automatically decreased, so that the charge stored in the variable capacitor 20 becomes less. When the scanning line (or the second control signal Gn) is in the high level again, the switch component 30 is turned on. The integrator 150 judges the touch status is no touch according to the amount of the integrated charges, and outputs a voltage Vout corresponding to the touch status with no touch.

When the light irradiates with the high intensity, the voltage Va0 is small to cause the voltage difference ΔV great, the capacitance of the variable capacitor 20 is automatically increased, so that the charge stored in the variable capacitor 20 becomes greater. In other words, when light irradiation intensity received by the light-sensing component 10 is greater, the capacitance of the variable capacitor 20 is greater. When the scanning line (or the second control signal Gn) is in the high level again, the switch component 30 is turned on. The integrator 150 judges the touch status is having the touch according to the amount of the integrated charges, and outputs a voltage Vout corresponding to the touch status having the touch.

It should be noted that, the judgment of the touch results in the embodiments of the present disclosure takes the light pen operation modes as an example. If operating by the finger, the judgment of the touch control results is opposite to that of the touch results when using the light pen.

Similarly, the display pixel unit 131 can have the same circuit structure and operation principle as the display pixel unit 130. The self-adjusting photosensitive touch circuit 101 can have the same circuit structure and operation principle as the self-adjusting photosensitive touch circuit 100, which will not be described herein. In addition, if considering other designs, the embodiments of the present disclosure can omit the integrator 150.

In summary, the self-adjusting photosensitive touch circuit and the display device of the present disclosure uses the characteristics of the variable capacitor which can automatically adjust the capacitance thereof. When there is no light irradiation on the touch circuit, the variable capacitor automatically changes to have a small capacitance, so that the stored charge is small. When there is light irradiation on the touch circuit, the variable capacitor changes to a large capacitance, so that the stored charge is great, thereby making a charge difference between the light irradiation condition and no light irradiation condition be greater. In other words, the range of the gate voltage difference of the light-sensing component can be increased, so as to improve sensitivity and accuracy of the light-sensing component and the touch display device thereof.

The above description is given by way of example, and not limitation. Given the above disclosure, one skilled in the art could devise variations that are within the scope and spirit of the disclosure disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A self-adjusting photosensitive touch circuit comprising:

a light-sensing component, for sensing a touch status, and receiving a first control signal, wherein the light-sensing component is enabled by a level of the first control signal, the light-sensing component comprises a first terminal, a second terminal and a third terminal, the first terminal of the light-sensing component receives the first control signal, and the third terminal of the light-sensing component receives a third control signal;

a variable capacitor, electrically coupled to the light-sensing component, wherein a capacitance of the variable capacitor is altered along with a voltage difference between two terminals of the variable capacitor; and a switch component, electrically coupled to the variable capacitor, and configured for receiving a second control signal, wherein the switch component is enabled by a level of the second control signal, the switch component comprises a first terminal, a second terminal, and a third terminal, the first terminal of the switch component receives the second control signal, and the second terminal of the switch component is electrically coupled to the second terminal of the light-sensing component; and an integrator, electrically coupled to the third terminal of the switch component, to output a touch signal corresponding to the touch status.

2. The circuit as claimed in claim 1, wherein the variable capacitor comprises a first terminal and a second terminal, the first terminal thereof is electrically coupled to the second terminal of the light-sensing component, and the second terminal thereof receives a reference voltage.

3. The circuit as claimed in claim 2, wherein when the first control signal is in the high level, the third control signal is in the high level, and rising edges of the first control signal and the third control signal are behind a rising edge of the second control signal.

4. The circuit as claimed in claim 3, wherein when the second control signal is in the high level, a voltage of the second terminal of the variable capacitor increases to a first voltage value; and when the second control signal is in the low level and the first control signal and the third control signal are in the high level, the voltage of the second terminal of the variable capacitor increases to a second voltage value.

5. The circuit as claimed in claim 1, wherein the variable capacitor comprises a first terminal and a second terminal, the first terminal of the variable capacitor receives a reference voltage, and the second terminal of the variable capacitor is electrically coupled to the second terminal of the light-sensing component.

6. The circuit as claimed in claim 5, wherein when the first control signal is in the high level, the third control signal is in the low level, falling edges of the first control signal and the third control signal are behind a rising edge of the second control signal.

7. The circuit as claimed in claim 6, wherein when the second control signal is in the high level, a voltage of the first terminal of the variable capacitor decreases to a first voltage value; and when the second control signal and the third control signal are in the low level and the first control signal is in the high level, the voltage of the first terminal of the variable capacitor decreases to a second voltage value.

8. The circuit as claimed in claim 1, wherein when light irradiation intensity received by the light-sensing component is higher, the capacitance of the variable capacitor is greater.

9. A self-adjusting photosensitive touch circuit comprising:

a light-sensing component, for sensing a touch status, and receiving a first control signal, wherein the light-sensing component is enabled by a level of the first control signal, the light-sensing component comprises a first terminal, a second terminal and a third terminal, the first terminal of the light-sensing component receives the first control signal, and the third terminal of the light-sensing component receives a third control signal;

a variable capacitor, electrically coupled to the light-sensing component, wherein a capacitance of the variable capacitor is altered along with a voltage difference between two terminals of the variable capacitor, the variable capacitor comprises a first terminal and a second terminal, the first terminal of the variable capacitor is electrically coupled to the second terminal of the light-sensing component, and the second terminal of the variable capacitor receives a reference voltage; and a switch component, electrically coupled to the variable capacitor, and configured for receiving a second control signal, wherein the switch component is enabled by a level of the second control signal;

wherein when the first control signal is in the high level, the third control signal is in the high level, and rising edges of the first control signal and the third control signal are behind a rising edge of the second control signal; when the second control signal is in the high level, a voltage of the second terminal of the variable capacitor increases to a first voltage value; and when the second control signal is in the low level and the first control signal and the third control signal are in the high level, the voltage of the second terminal of the variable capacitor increases to a second voltage value.

10. The circuit as claimed in claim 9, wherein the switch component comprises a first terminal, a second terminal, and a third terminal, the first terminal of the switch component receives the second control signal, and the second terminal of the switch component is electrically coupled to the second terminal of the light-sensing component.

11. The circuit as claimed in claim 10, further comprising an integrator, electrically coupled to the third terminal of the switch component, to output a touch signal corresponding to the touch status.

12. The circuit as claimed in claim 9, wherein when light irradiation intensity received by the light-sensing component is higher, the capacitance of the variable capacitor is greater.

13. A self-adjusting photosensitive touch circuit comprising:

a light-sensing component, for sensing a touch status, and receiving a first control signal, wherein the light-sensing component is enabled by a level of the first control signal, the light-sensing component comprises a first terminal, a second terminal and a third terminal, the first terminal of the light-sensing component receives the first control signal, and the third terminal of the light-sensing component receives a third control signal;

a variable capacitor, electrically coupled to the light-sensing component, wherein a capacitance of the variable capacitor is altered along with a voltage difference between two terminals of the variable capacitor, the variable capacitor comprises a first terminal and a second terminal, the first terminal of the variable capacitor receives a reference voltage, and the second terminal of the variable capacitor is electrically coupled to the second terminal of the light-sensing component; and a switch component, electrically coupled to the variable capacitor, and configured for receiving a second control signal, wherein the switch component is enabled by a level of the second control signal;

wherein when the first control signal is in the high level, the third control signal is in the low level, falling edges of the first control signal and the third control signal are behind a rising edge of the second control signal; when the second control signal is in the high level, a voltage of the first terminal of the variable capacitor decreases to a first voltage value; and when the second control signal and the third control signal are in the low level and the first control signal is in the high level, the voltage of the first terminal of the variable capacitor decreases to a second voltage value.

14. The circuit as claimed in claim 13, wherein the switch component comprises a first terminal, a second terminal, and a third terminal, the first terminal of the switch component receives the second control signal, and the second terminal of the switch component is electrically coupled to the second terminal of the light-sensing component.

15. The circuit as claimed in claim 14, further comprising an integrator, electrically coupled to the third terminal of the switch component, to output a touch signal corresponding to the touch status.

16. The circuit as claimed in claim 13, wherein when light irradiation intensity received by the light-sensing component is higher, the capacitance of the variable capacitor is greater.

* * * * *